US010129285B2

(12) United States Patent
Johns et al.

(10) Patent No.: US 10,129,285 B2
(45) Date of Patent: Nov. 13, 2018

(54) END-TO-END TAINT TRACKING FOR DETECTION AND MITIGATION OF INJECTION VULNERABILITIES IN WEB APPLICATIONS

(71) Applicant: SAP SE, Walldorf (DE)

(72) Inventors: Martin Johns, Karlsruhe (DE); Stephan Pfistner, Darmstadt (DE)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 15/140,154

(22) Filed: Apr. 27, 2016

(65) Prior Publication Data

US 2017/0318045 A1   Nov. 2, 2017

(51) Int. Cl.
*H04L 29/06* (2006.01)
*H04L 29/08* (2006.01)

(52) U.S. Cl.
CPC ...... *H04L 63/1433* (2013.01); *H04L 63/1416* (2013.01); *H04L 63/168* (2013.01); *H04L 67/02* (2013.01); *H04L 69/22* (2013.01)

(58) Field of Classification Search
CPC . H04L 63/1433; H04L 63/1441; H04L 67/02; H04L 67/42
See application file for complete search history.

(56) References Cited

U.S. PATENT DOCUMENTS

| 9,501,650 | B2* | 11/2016 | Chess | G06F 21/577 |
| 2011/0185271 | A1* | 7/2011 | Aciicmez | G06F 21/563 |
| | | | | 715/234 |
| 2011/0185427 | A1* | 7/2011 | Aciicmez | G06F 21/53 |
| | | | | 726/24 |
| 2011/0252475 | A1* | 10/2011 | Mui | G06F 21/56 |
| | | | | 726/23 |

(Continued)

OTHER PUBLICATIONS

Zavou et al., Taint-Exchange: a Generic System for Cross-process and Cross-host Taint Tracking, 2011, Columbia University, 16 Pages. (Year: 2011).*

(Continued)

*Primary Examiner* — Jason K Gee
*Assistant Examiner* — Christopher C Harris
(74) *Attorney, Agent, or Firm* — Fountainhead Law Group PC

(57) ABSTRACT

The embodiments described in this disclosure may be adapted to detect and mitigate tainted content in network communications across client-server boundaries using a pair of complementary taint engines at both ends of the network. Methods, systems and computer readable storage media are adapted to receive request from a web application of a client system and generate standard responses. The header of the request can include a request taint value that can be evaluated to determine whether the request is a standard network transfer protocol request (e.g., HTTP request) or a multipart network transfer protocol request (e.g., a CTTP request). If (Continued)

the request is a multipart network transfer protocol request, a multipart network transfer protocol response can be constructing based on the generated standard network transfer protocol response, and client systems can be configured to detect tainted content based on the multipart network transfer protocol response.

20 Claims, 10 Drawing Sheets

(56) References Cited

U.S. PATENT DOCUMENTS

| | | | | |
|---|---|---|---|---|
| 2013/0086687 | A1* | 4/2013 | Chess | G06F 21/53 |
| | | | | 726/25 |
| 2013/0091578 | A1* | 4/2013 | Bisht | G06F 21/53 |
| | | | | 726/25 |
| 2013/0139267 | A1* | 5/2013 | Amit | H04L 63/1433 |
| | | | | 726/25 |
| 2015/0096006 | A1* | 4/2015 | Chu | G06F 21/128 |
| | | | | 726/9 |
| 2017/0041340 | A1* | 2/2017 | Velasco Sarasola | |
| | | | | H04L 63/1466 |

OTHER PUBLICATIONS

Stock et al, Precise Client-side Protection against DOM-based Cross-Site Scripting, 2014, USENIX, 17 Pages. (Year: 2014).*
Hydra et al, Current state of research on cross-site scripting (XSS)—A systematic literature review, 2015, Elsevier, 17 Pages (Year: 2015).*
Jovanovic et al, Pixy: A Static Analysis Tool for Detecting Web Application Vulnerabilities, 2006, IEEE, 6 Pages. (Year: 2006).*
Louw et al, Blueprint: Robust Prevention of Cross-site Scripting Attacks for Existing Browsers, 2009, IEEE, 16 Pages (Year: 2009).*
Kiezun et al, Automatic Creation of SQL Injection and Cross-Site Scripting Attacks, 2009, IEEE, 11 Pages (Year: 2009).*
Steven Van Acker, Nick Nikiforakis, Lieven Desmet, Wouter Joosen, and Frank Piessens. FlashOver: Automated discovery of cross-site scripting vulnerabilities in rich internet applications. In ASIA Computer and Communications Security (ASIACCS), May 2012. partner: KUL; project: WebSand, NESSoS.
Prithvi Bisht and V. N. Venkatakrishnan. XSS-GUARD: Precise dynamic detection of cross-site scripting attacks. In Detection of Intrusions and Malware & Vulnerability Assessment (DIMVA'08), 2008.
S. Bradner. Key words for use in rfc to indicate requirement levels, 3 1997. RFC 2119.
T. Bray. The javascript object notation (json) data interchange format, 3 2014. RFC 7159.
CERT. Advisory ca-2000-02 malicious html tags embedded in client web requests, Feb. 2000.
Lucian Constantin. Xss worm hits orkut, Sep. 2010.
Lucian Constantin. Facebook hit by xss worm, Mar. 2011.
Juan Jose Conti and Alejandro Russo. A taint mode for python via a library. In Tuomas Aura, Kimmo Jarvinen, and Kaisa Nyberg, editors, NordSec, vol. 7127 of Lecture Notes in Computer Science, pp. 210-222. Springer, 2010.
D. Crocker and P. Overell. Augmented bnf for syntax specifications: Abnf, 1 2008. RFC 5234.
Dancho Danchev. Twitter hit by multiple variants of xss worm, Apr. 2009.
Dorothy E. Denning. A lattice model of secure information flow. Commun. ACM, 19(5), 1976.
Stefano Di Paola. DominatorPro: Securing Next Generation of Web Applications. [software], https://dominator.mindedsecurity.com/, 2012.
R. Fielding and J. Reschke. Hypertext transfer protocol (http/1.1): Message syntax and routing, 6 2014. RFC 7230.
Left intentionally blank.

N. Freed and N. Borenstein. Multipurpose internet mail extensions (mime) part one: Format of internet message bodies, 11 1996. RFC 2045.
N. Freed and N. Borenstein. Multipurpose internet mail extensions (mime) part two: Media types, 11 1996. RFC 2045.
Google, Inc. Protocol buffers—encoding. https://developers.google.com/protocol-buffers/docs/encoding.
Jeremiah Grossman. Blackhat talk; phishing with superbait, Oct. 2005.
Salvatore Guarnieri, Marco Pistoia, Omer Tripp, Julian Dolby, StephenTeilhet, and Ryan Berg. Saving the world wide web from vulnerable javascript. In Matthew B. Dwyer and Frank Tip, editors, ISSTA, pp. 177-187. ACM, 2011.
Arjun Guha, Shriram Krishnamurthi, and Trevor Jim. Using static analysis for Ajax intrusion detection. In Proceedings of the 18th international conference on World wide web (WWW'09), pp. 561-570, New York, NY, USA, 2009. ACM.
WG Halfond, Jeremy Viegas, and Alessandro Orso. A classification of sql-injection attacks and countermeasures. In IEEE International Symposium on Secure Software Engineering, pp. 13-15, 2006.
Steve Hanna, Richard Shin, Devdatta Akhawe, Arman Boehm, Prateek Saxena, and Dawn Song. The Emperors New APIs: On the (In)Secure Usage of New Client Side Primitives. In Workshop on Web 2.0 Security and Privacy (W2SP), 2010.
Mario Heiderich, Jorg Schwenk, Tilman Frosch, Jonas Magazinius, and Edward Z Yang. mxss attacks: Attacking well-secured web-applications by using innerhtml mutations. In ACM Conference on Computer and Communications Security (CCS), 2013.
Nenad Jovanovic, Christopher Kruegel, and Engin Kirda. Pixy: A Static Analysis Tool for Detecting Web Application Vulnerabilities. In IEEE Symposium on Security and Privacy, May 2006.
Samy Kamkar. I'll never get caught. i'm popular!, Apr. 2005.
Dawn Kawamoto. Worm lurks behind myspace profiles, Jul. 2006.
Adam Kieyzun, Philip J. Guo, Karthick Jayaraman, and Michael D. Ernst. Automatic creation of sql injection and cross-site scripting attacks. In International Conference on Software Engineering, ICSE '09, pp. 199-209, Washington, DC, USA, 2009. IEEE Computer Society.
Amit Klein. Dom based cross site scripting or xss of the third kind. Web Application Security Consortium, Articles, 4, 2005.
Mohit Kumar. Exploiting google persistent xss vulnerability for phishing, Nov. 2011.
Sebastian Lekies and Martin Johns. Lightweight integrity protection for web storage-driven content caching. In W2SP, 2, 2012.
Sebastian Lekies, Ben Stock, and Martin Johns. 25 million flows later-large-scale detection of dam-based xss. In ACM Conference on Computer and Communications Security (CCS), 2013.
E Levinson. The mime multipart/related content-type, 8 1998. RFC 238T.
Yacin Nadji, Prateek Saxena, and Dawn Song. Document Structure Integrity: A Robust Basis for Cross-site Scripting Defense. In Network & Distributed System Security Symposium (NDSS 2009), 2009.
A. Nguyen-Tuong, S. Guarnieri, D. Greene, J. Shirley, and D. Evans. Automatically hardening web applications using precise tainting. In 20th IFIP International Information Security Conference, May 2005.
N. Nikiforakis, L Invernizzi, A. Kapravelos, S. Van Acker, W. Joosen, C. Kruegel, F. Piessens, and G. Vigna. You are what you include: Large-scale evaluation of remote javascript inclusions. In ACM Conference on Computer and Communications Security (CCS), Raleigh, NC, Oct. 2012.
Open Web Application Project (OWASP). Path traversal. [online], http://www.owasp.org/index.php/Path_Traversal (Aug. 8, 2008), May 2008.
OWASP. Cross-site scripting (xss), Sep. 2013.
Stefano Di Paola. 23rd ccc conference: Subverting ajax, Dec. 2006.
Riccardo Pelizzi and R. Sekar. Protection, usability and improvements in reflected xss filters. In Asia Computer and Communications Security (ASIACCS), May 2012.
Tadeusz Pietraszek and Chris Vanden Berghe. Defending against Injection Attacks through Context-Sensitive String Evaluation. In Recent Advances in Intrusion Detection (RAID2005), 2005.

(56) References Cited

OTHER PUBLICATIONS

David Ross Happy 10th birthday cross-site scripting!, Dec. 2009.
A. Sabelfeld and A. C. Myers Language-based information-flow security. IEEE J.Sel. A. Commun., 21(1), 2006.
P. Saint-Andre, D. Crocker, and M. Nottingham. Deprecating the "x-" prefix and similar constructs in application protocols, 6 2012. RFC 6648.
Prateek Saxena, Steve Hanna, Pongsin Poosankam, and Dawn Song. FLAX: Systematic Discovery of Client-side Validation Vulnerabilities in Rich Web Applications. In NDSS. The Internet Society, 2010.
Edward J. Schwartz, Thanassis Avgerinos, and David Brumley. All you ever wanted to know about dynamic taint analysis and forward symbolic execution (but might have been afraid to ask). In IEEE Symposium on Security and Privacy, 2010.
S. Stuart and R. Fernando. Encoding rules and mime type for protocol buffers, 4 2013. RFC draft draft-rfernando-protocol-buffers-00.
Zhendong Su and Gary Wassermann. The Essence of Command Injection Attacks in Web Applications. In Proceedings of POPL'06, Jan. 2006.
Symantec. Js.yamanner@m, Jun. 2006.
Omer Tripp, Marco Pistoia, Stephen J. Fink, Manu Sridharan, and Omri Weisman. TAJ: Effective Taint Analysis for Java. In ACM SIG-PLAN 2009 Conference on Programming Language Design and Implementation (PLDI 2009), Jun. 2009.
Gary Wassermann and Zhendong Su. Sound and Precise Analysis of Web Applications for Injection Vulnerabilities. In Proceedings of Programming Language Design and Implementation (PLDI'07), San Diego, CA, Jun. 10-13, 2007.
Web Application Security Consortium. The Web Security Threat Classification—Path Traversal. [online], http://www.webappsec.org/projects/threat/classes/path_traversal.shtml, (Aug. 8, 2008), 2005.
Zack Whittaker. Ubuntu forums hacked; 1.82m logins, email addresses stolen, Jul. 2013.
Yichen Xie and Alex Aiken. Static Detection of Security Vulnerabilities in Scripting Languages. In 15th USENIX Security Symposium, 2006.
Wei Xu, Sandeep Bhatkar, and R. Sekar. Taint-Enhanced Policy Enforcement: A Practical Approach to Defeat a Wide Range of Attacks. In 15th USENIX Security Symposium, Aug. 2006.

* cited by examiner

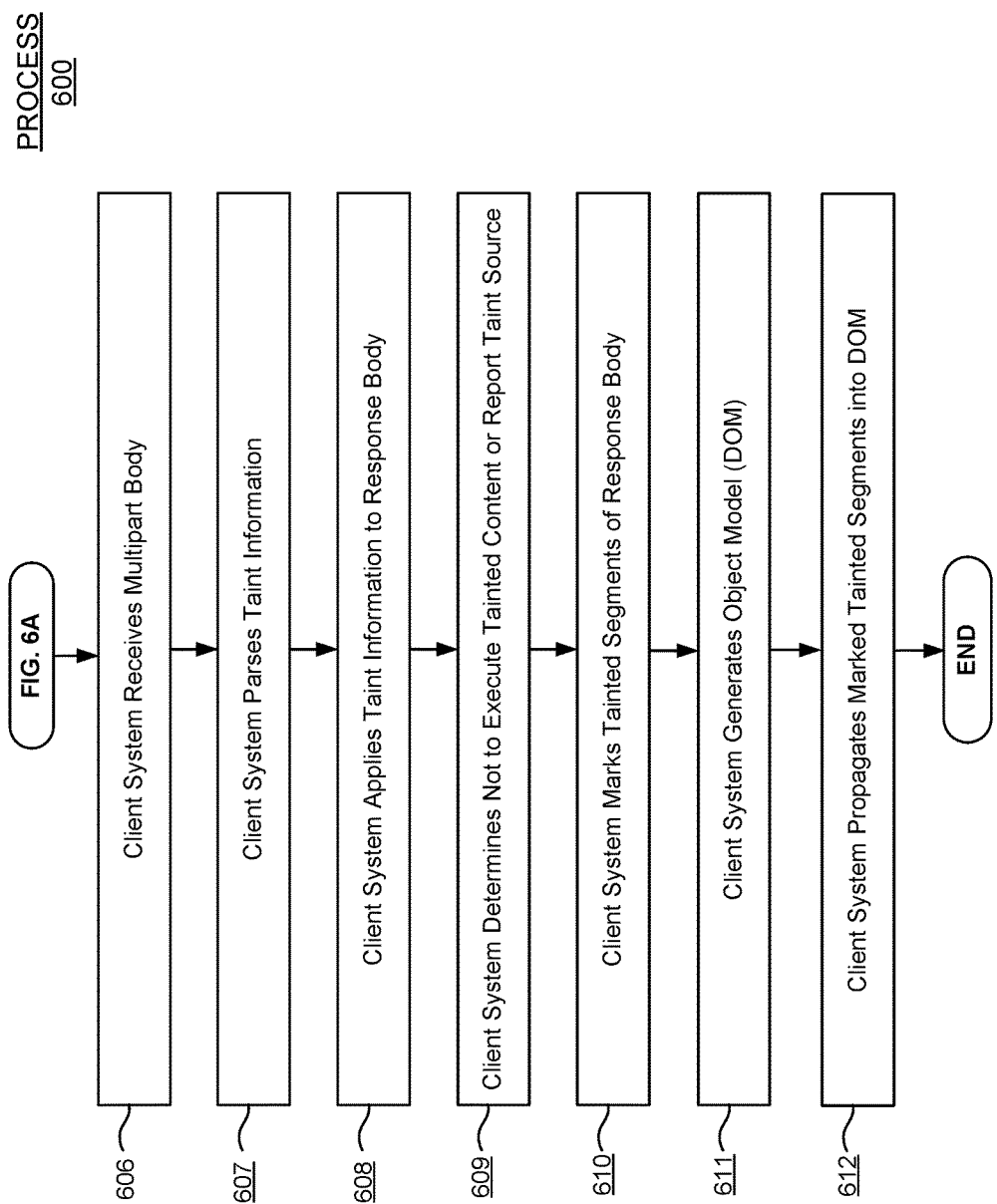

END-TO-END TAINT TRACKING FOR DETECTION AND MITIGATION OF INJECTION VULNERABILITIES IN WEB APPLICATIONS

TECHNICAL FIELD

At least certain embodiments disclosed herein relate generally to web security, and more particularly to detecting vulnerabilities in web applications.

BACKGROUND

Cross-Site Scripting ("XSS") can be classified as a "reflected" or "non-persistent" form of attack in web applications. XSS injection is a serious and widespread security issue and is probably the most widespread vulnerability for web applications. But XSS is not the only injection vulnerability that affects web applications. Similar bug patterns can also be found, for instance, in Structured Query Language ("SQL") injection or remote command injection. All such vulnerabilities can be caused by insecure data flowing from attacker-controlled sources to security-sensitive sinks, such as application programming interface ("API") sinks. Data tainting (or taint checking) is a programming language feature that flags input data as potentially tainted. A flag may propagate to all data derived from this input. As a result, application code can implement runtime assertions to ensure security critical code is not being called using tainted data. Taint tracking is one approach to detecting and mitigating XSS attacks.

But conventional approaches in taint-tracking only capture data flows either on the server-side or the client-side. This means, only purely server-side or purely client-side flows can be observed. For example, a flow from a server-side source into a client-side sink is invisible to such systems. In addition, existing approaches are prone to false positives and false negative, as they are unable observe data flows from client-side sources to server-side sinks, and vice versa.

Given the fact that modern web applications distribute their application code (e.g., in the form of JavaScript) between client and server, a significant number of potentially vulnerable data flows can be overlooked by conventional solutions.

SUMMARY

The embodiments described in this disclosure include improved methods, systems and computer readable media configured for performing end-to-end taint tracking for web applications.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIGS. 6A-6B depict flow charts of an example embodiment of a process for performing end-to-end taint tracking in accordance with the techniques described in this disclosure.

DETAILED DESCRIPTION

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the principles and techniques described in this disclosure.

At least certain embodiments described in this disclosure comprise a system that can precisely track taint information for attacker-controlled sources to security-sensitive application programming interface API sinks. This taint tracking system may be configured to span boundaries between client and server execution environments to enable end-to-end taint-tracking of injection vulnerabilities in web applications. The techniques presented include a data efficient encoding and mapping scheme for the tracking taint information. A multipart network transfer protocol mechanism is provided that enables incorporating taint information regarding data flows into standard network transfer protocol messages.

At the outset, it should be noted that although certain embodiments may be described with reference to standard hypertext transfer protocol ("HTTP") communications, the techniques described in this disclosure are not limited to any particular network transfer protocol or communication system.

Figure 1:
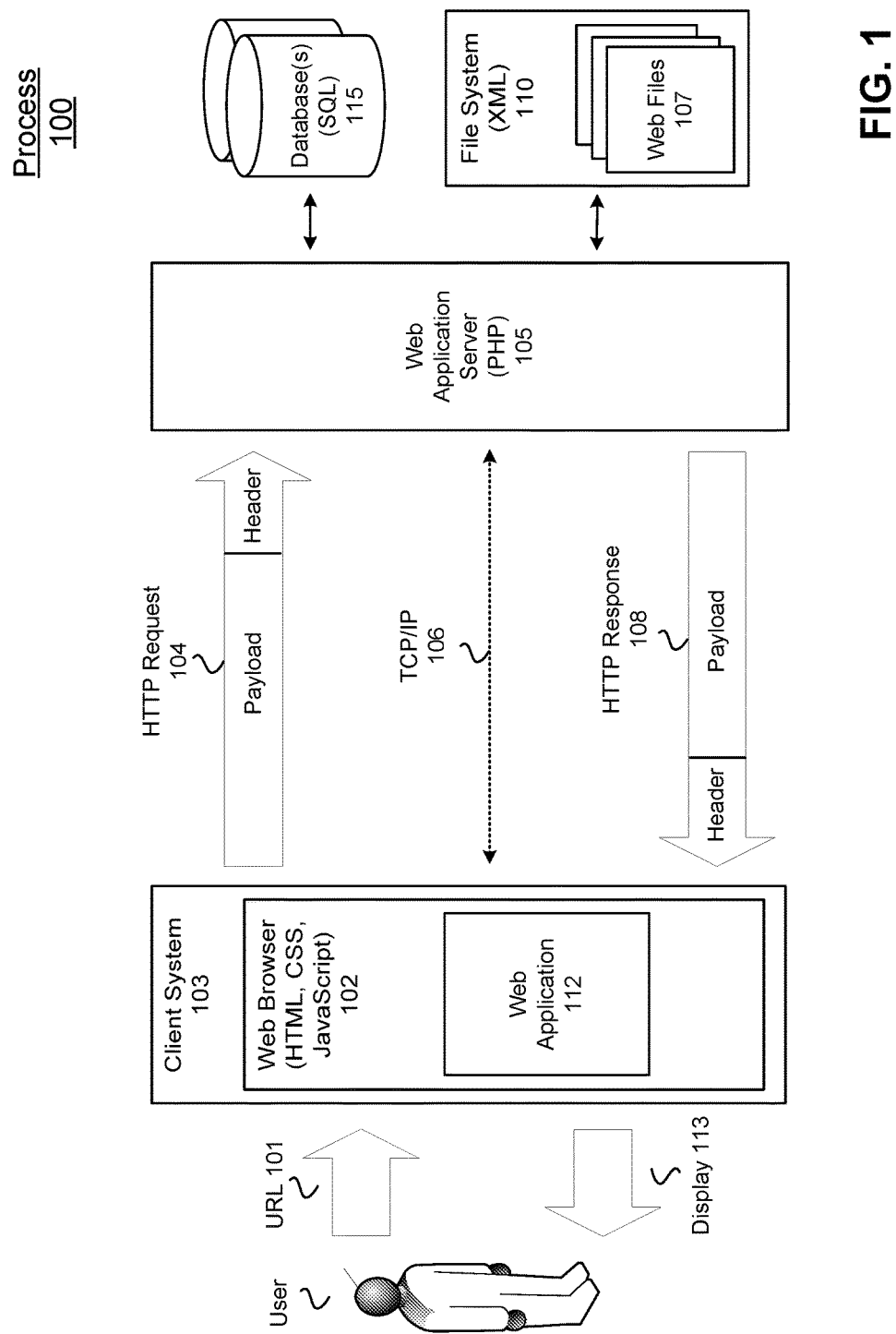
FIG. 1 depicts a conceptual block diagram of an example process of hypertext transfer protocol ("HTTP") communications over a conventional network.

FIG. 1 depicts a conceptual block diagram of an example process of HTTP communications over a conventional network. This process 100 begins by receiving a uniform resource locator ("URL") 101 from a user at a web browser 102 of a client system 103 that is running a web application 112. The URL may be a web page, image, video, or other piece of online content. The web browser 102 may be configured to process HTML, CSS, or JavaScript languages, as well as such languages.

In response to the URL request 101 from the user, the web browser 102 may generate an HTTP request 104 and communicate that request to a web server 105 over a network such as over a TCP/IP connection 106. The HTTP request 104 may comprise a request header and a request body. The HTTP request header may be used for routing the HTTP request 104 through the network and the HTTP request body may include the data to be communicated with the web server 105. The web server 105 may process the HTTP request 104 using a server-side scripting language designed for web applications such as the Personal Home Page ("PHP") scripting language.

Depending on the type of HTTP request 104, the web server 105 may access one or more databases 115, such as SQL databases, or may access one or more web files 107 from a file system 110, such as an XML file system. The web server 105 can then include the requested information into an HTTP response 108, which is then communicated back to the web browser 102, and provided to the user via displaying 113 a web page, image, video, or other online content. The HTTP response 108 may also comprise an HTTP response header and an HTTP response body.

Networked applications, and especially web applications, often employ a varying amount of heterogeneous computer languages, such as programming languages (e.g., Java, PHP, C#), query languages (e.g., SQL or XPATH), or mark-up languages (e.g., XML or HTML). In the case of web applications, some of these languages are interpreted on the server-side and some in the user's web browser. As used in this disclosure, the language that was used to program the application (e.g., Java) is referred to as its "native language", and other computer languages that are used within the application are referred to as "foreign languages".

A web application's 112 runtime environment can execute application code written in its native language. Foreign code may either be passed on to external interpreters, sent to other hosts, or transmitted to the user's web browser to be processed there. Server-side foreign languages are mostly employed for data management. As an example, SQL may be used for interaction with databases and XML may be used for structured data storage in filesystems. Furthermore, for interacting with remote hosts, XML-based web service languages are regularly employed. Finally, on the client side, foreign languages may be used to define and implement the application's interface (e.g., HTML, JavaScript, and CSS).

In addition, applications can include foreign code from different origins. Often foreign code is directly included in the application's source code. In this case, the foreign code can be kept in static string constants. The application can also obtain foreign code at runtime from external data sources such as databases or filesystems. One example of this would be predefined HTML templates. In such cases, the interpreter (i.e., parser) can read the foreign code into string variables.

In most cases, an application assembles foreign code using the string type corresponding to the application's native language. For this purpose, during execution static string constants and dynamically obtained data values may be combined through string concatenation. The native language's interpreter can then process these strings and pass them onto their respective destinations. Example pseudo code for foreign code assembly is provided in APPENDIX A at the end of this disclosure.

String-Based Injection Vulnerabilities

String-based injection vulnerabilities are errors which result in inclusion of insufficiently sanitized, user-controlled data into the foreign code as it is being dynamically assembled. Such errors enable an attacker to manipulate the syntactic content of one or more of the foreign code expressions. Hence, a successful string-based code injection may enable an attacker to initiate actions with the same capabilities and privileges as the attacked interpreter, such as altering the content of a web page through injection of HTML code or executing arbitrary commands on a database via injecting SQL syntax.

String-based code injection comprises injection vulnerabilities that may occur during dynamic assembly of foreign code using the native language's string type or may allow the attacker to alter the semantics of the attacked foreign code statement through alteration of syntactic content, such as language keywords or meta-characters. In SQL injection, for example, an attacker is able to maliciously manipulate SQL queries that are passed to the application's database. By adding attacker-controlled SQL commands, such a flaw can lead to unauthorized access, data manipulation, or information disclosure, etc.

In command injection, applications may dynamically create executable code in either their native language (to be interpreted with commands such as eval( )) or as input to a different server side interpreter. In such cases, this dynamic data might enable an attacker to execute arbitrary commands on the attacked server using the privileges of the vulnerable application. This class of injection vulnerabilities is also known under domain specific names such as "\PHP injection," "\ASP injection," or "\shell injection." Example pseudo code for command shell injection is provided in APPENDIX A at the end of this disclosure.

Path traversal injection is a special variant within the class of injection flaws. Instead of injecting syntactic content consisting of language keywords, the attacker injects meta-characters (such as ../) into the file system path information. This enables the attacker to break out of the application's allowed data directories, so that arbitrary files in the filesystem can be accessed. This attack is also known as "\dot-dot-slash," "\directory traversal," "\directory climbing," or "\backtracking." Example pseudo code for path traversal vulnerability is provided in APPENDIX A at the end of this disclosure.

Cross-Site Scripting ("XSS")

XSS vulnerability is a programming error within a web application or the corresponding execution environment which unintentionally allows an attacker to conduct a XSS attack. XSS is considered to be any injection vulnerability that allows the injection of arbitrary client-side code or markup into a web application. The injected content may be crafted in such a way that a browser interprets it as client-side code or markup without the user's consent. This includes JavaScript injection, Hypertext Markup Language ("HTML") injection, Cascading Style Sheets ("CSS") injection, and the injection of other past or upcoming client-side scripting or markup languages (e.g., VBScript, SVG, etc.).

XSS attacks are a type of injection problem in which malicious scripts are injected into otherwise benign and trusted websites. A XSS attack is caused by adversary-controlled data since the adversary can either directly inject data into a given web application or can trick a victim into performing the attack steps (so called self-XSS attack). It is unauthorized since the attacker injects data into the application without the user's consent. The attack manifests when the user's browser interprets the injected data as client-side code or markup, again without the user's consent.

A XSS vulnerability is a software fault that can be activated via an external trigger as part of a XSS attack. Note that the vulnerability can be either located in the web application itself or within the execution environment (e.g., universal XSS attacks where an adversary exploits a browser bug to inject data). Again, it is emphasized that XSS vulnerabilities may be unintentional and exclude legitimate use cases where code is injected.

To illustrate this point further, the following examples provide an overview of different facets of XSS attacks:

1) HTML Injection: this type of attack allows the injection of malicious HTML tags. Hence, XSS is not limited to the injection of scripts, but can include injection of anything that can be expressed with HTML. This of course includes JavaScript enclosed in script tags or event handlers, but additionally also includes any kind of plugin content embedded via object or embedded tags (e.g., Flash, PDFs, or Java) and all the other tags that can be used for attacks (such as defacement or phishing).

2) JavaScript Injection: One way to inject JavaScript into a web application is to use HTML script tags or event handlers as described above. However, sometimes it is also possible to directly inject JavaScript without the need for HTML, for example, when JavaScript code is directly generated by the application from user input. This generation can take place anywhere within the application, for example at the client-side when data strings are being converted to code or at the server-side when the scripts are being dynamically generated. The underlying XSS vulnerability for an injection of such (client-side) content can be caused by different entities. Depending on the specific entity, the exploitation, detection, mitigation, or prevention techniques must be adapted to account for the specific environment.

The most well-known type of XSS attack is the server-side variant where the injection problem is caused by the server-side code used to generate dynamic HTML or script content. Generally, there are two types of server-side XSS problems including (1) non-persistent/reflected, and (2) persistent. In a reflected XSS server-side vulnerability, the server "reflects" user input contained in a request into the response handed back to the client browser. Hence, a malicious body can execute in the same browser that also generated the request. In order to exploit such a vulnerability, an attacker needs to lure a victim into generating the malicious request in the client browser. This can either be done by luring the victim into opening a malicious URL or through phishing or social engineering, or by luring the victim onto an attacker controlled web page that is capable of generating the malicious request (e.g., by embedding an "iframe" or submitting a hidden form).

In a persistent server-side XSS vulnerability, the application also outputs potentially malicious user input in an uncontrolled fashion. As opposed to reflected XSS, in this case the user input is not directly reflected back to the user, but stored on the server (e.g., in a database or file). Depending on the application's behavior, this data is then output to other users of the application. Hence, instead of luring a user into clicking a malicious link, in this case the adversary simply injects the body directly into the application. Afterwards, the attacker only needs to wait until the body is delivered to another user of the same application. Thus, it is easier for an attacker to conduct the attack because phishing or social engineering is not necessary. Due to the persistent nature of such attack, it can be used to construct XSS worms, where the server-side backend of the web application serves as a distribution channel for the worm.

For client-side, the XSS may be referred to as Document Object Model ("DOM") based XSS that is caused by client-side code, i.e., legitimate JavaScript routines executed in the client's web browser. The types of client-side XSS problems also include non-persistent/reflected and persistent. Client-side non-persistent XSS vulnerabilities are similar to their server-side counterparts.

Nevertheless there are some very important differences. While server-side XSS attacks are caused by malicious input to the server (i.e., everything that is contained in the HTTP request), client-side XSS attacks are caused by malicious inputs to the client-side (i.e., any attacker controllable data in a web application's DOM). Hence, traditional intrusion detection systems that are deployed at the server-side will not necessarily be able to detect client-side XSS attacks.

Another difference is the possibility to detect vulnerabilities. While for the server-side there are many sophisticated tools that have been developed, there are almost no tools to detect client-side XSS vulnerabilities. The amount of source code that is executed within such a client-side application can therefore be significantly different from the amount of code that is hosted by the originating server. Scanning and patching vulnerabilities are thus much harder.

Since server-side XSS is caused by dynamic server-side scripts, server-side vulnerabilities are not present in static HTML pages. Client-side XSS vulnerabilities, however, are caused by dynamic client-side scripts. As a result, static HTML pages are potentially vulnerable to client-side XSS as soon as JavaScript code is embedded. Further, client-side XSS is not necessarily caused by HTML and JavaScript, but can also be caused by plugin-based content such as Flash.

While the server-side is under control of the website provider, the client-side can be completely controlled by the user. Many client-side XSS vulnerabilities are caused by browser quirks (e.g., by the CSS expression statement in a web browser). Furthermore, with the introduction of HTML5 related technologies, a lot of new ways to conduct XSS attacks are being developed for web browsers. Client-side persistent XSS has recently become a problem with the introduction of HTML5 and related technologies that include client-side storage functionality such as Web Storage, the File API, indexed Databases, and the Offline AppCache.

A necessary precondition of an XSS vulnerability is that an attacker can inject data (e.g., HTML tags, JavaScript code, or CSS markup) into a given web application and this data is later executed. Hence, XSS can be treated as an information flow problem. In a first step, sources that an attacker can potentially control need to be identified. Afterwards, how data is processed within the application and whether attacker-controlled data eventually reaches a security sensitive sink, needs to be analyzed. This kind of information flow analysis is a well-understood field and many different techniques exist to implement information flow analysis.

However, unlike monolithic systems, web applications can be a composite of various detached components, typically consisting of at least the web browser, the application server, and a server-side persistence system or database. Each of these components consists of several subsystems. For example, a web browser includes a set of parsers for complex languages such as JavaScript, HTML, XML, CSS, SVG, ActionScript, etc. In practice, many information flows span more than one of these components and subcomponents, including information flows spanning both server-side and client-side code or data that is temporarily stored in persistence, either on the server or client-side. As a consequence, covering such complex flows is a major challenge for protective systems.

Taint Tracking

The term "taint tracking" describes a class of dynamic approaches that detect and mitigate the flow of tainted information through a program during execution. It is essentially tracking untrusted information traversing a network. Any payload in the body of an HTTP request or response that potentially alters the semantics of a statement being executed may be considered untrusted. As described above, code injection vulnerabilities occur because of direct data flows between attacker-controlled sources and security-sensitive sinks.

Current solutions cannot track these data flows from end to end. Such sinks in the context of web applications are in the majority of all cases APIs, which implicitly convert string data into computer code. In the context of web applications, sources and sinks include, for instance, but are not limited to:

(1) server side sources (data sources through which potentially malicious string data enters the web application) including HTTP parameters, HTTP headers, HTTP method and request line, and HTTP body and meta data of objects contained in such bodies;

(2) server-side sinks including APIs that connect to SQL and non-SQL databases, APIs that access the file system, APIs that interface with XML web services, and APIs, such as "eval" or "system", that convert strings into executable code;

(3) client-side sources (data sources through which potentially malicious string data enters the client-side JavaScript code) including document.URL and document.location, Referrer, PostMessage, and XMLHttpRequest responses; and (4) client-side sinks may including APIs that alter the web page's DOM (innerHTML, document.write), APIs, such as eval, that convert strings into executable code, and APIs that access client-side storage (localStorage, document.cookie, etc.).

For all these cases, as soon as a flow from an attacker-controlled source (either server- or client-side) into a sink (either server- or client-side) occurs, where sufficient validation or sanitization of the transported string data is not applied, a code injection vulnerability can exist. But as long as both components (both the server and the browser) are used together and the mitigation techniques described in this disclosure are enabled, any system can be made immune to string-based injection attacks. This means vulnerabilities such as XSS, SQL injection or Command Injection cannot be exploited.

In general, taint tracking approaches detect injection vulnerabilities through detecting flows from attacker controlled sources to security sensitive sinks. For instance, HTTP parameters that end up in SQL statements may lead to SQL injection. However, existing approaches are prone to false positives and false negatives. Current server-side tainting approaches have to assume that all data of the incoming HTTP request is tainted. But this is not necessarily the case—in situations where the request is generated in a web browser, e.g., through XMLHttpRequest or HTML element creation, the attacker has only very limited control (or no control at all) over the actual HTTP request. Since no client-side taint information is available on the server-side, the server may over-taint, which leads to false positives, especially in the realm of XSS. Current client-side tainting approaches have no information of the trustworthiness of the string-data found in the DOM. Thus, the only taint-sources available to these approaches come from client-side APIs such as "document.location" or "document.referer". These approaches are therefore susceptible to under-tainting, as tainted information in the HTTP body cannot be seen on the client-side.

Figure 2:
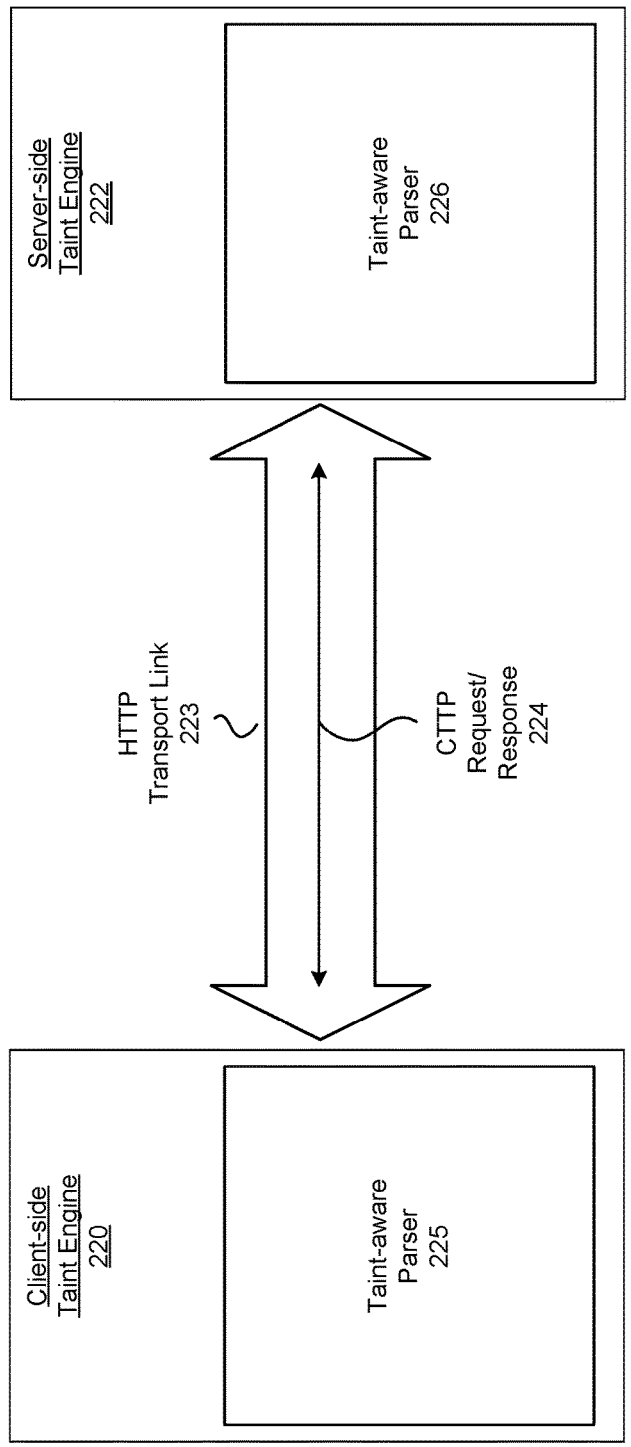
FIG. 2 depicts a conceptual block diagram of an example embodiment of a taint tracking system in accordance with the techniques described in this disclosure.

In at least certain embodiments, complementary taint engines can be configured at each end of a transport link between client and server. Using these complementary taint engines, the end-to-end taint tracking approach described in this disclosure can seamlessly track data flows across client-server boundaries. FIG. 2 depicts a conceptual block diagram of an example embodiment of a taint tracking system configured in accordance with the techniques described in this disclosure. In the illustrated embodiment, the taint engines 220 and 222 can be configured to communicate taint information in Character Taint Transfer Protocol ("CTTP") request and responses 224 from one environment (client or server) to the other across an HTTP transport link 223. During code execution, the taint flows may be tracked. As soon as a message containing potentially tainted data leaves one environment and reaches the other (e.g., in the form of HTTP requests or responses), the taint information that applies to the message may be serialized in a fitting container format and added to the message.

In this example, upon receiving the message, the receiving environment can first parse the taint information and apply it to the received string data in the message. After this operation, the content of the network transfer protocol message can be processed at one or more corresponding parsers, such as taint-aware parsers 225 and 226. Thus, taint information belonging to the sent string data may be present at the beginning of the process. As a consequence, the embodiments described in this disclosure can reliably track the flow of potentially attacker-controlled data even where the data flow spans more than one execution environment (e.g., at both the client and server side).

The client system can communicate taint information via its taint engine 220 to the server so that only potentially attacker-controlled segments of the HTTP request are received as tainted by the server taint engine 222, while the rest of the request is correctly interpreted as trustworthy. Unnecessary false positives due to over-tainting are therefore avoided. And similarly, the server can communicate taint information to the client browser via the server taint engine 222. The client browser may then be able to mark attacker-influenced regions in the HTTP response as tainted and propagate this information when a Document Object Model ("DOM") is generated. As a consequence, if a client-side JavaScript accesses any tainted regions of the DOM, the taint information can be correctly obtained by the client-side taint engine 220 and processed accordingly in cases when the data reaches a security sensitive API sink.

The embodiments of the server-side and client-side parsers described in this disclosure can be taint-aware and are adapted to handle HTTP data as a prerequisite for applying the communicated taint information to the received HTTP data. Thus, parsers can determine during parse time whether any variable, non-literal tokens (i.e., non-string and non-numeric values) in the respective syntax carry potentially tainted content. As examples, a tainted HTML tag name can be a non-ambiguous sign for an HTML injection, a tainted JavaScript code token can be XSS, and a tainted SQL keyword (such as SELECT or UPDATE) can be an instance of a SQL injection.

As the taint information of all tokens is available during parse time, and the information is precise (as discussed above), the system described in this disclosure is capable of real-time mitigation. In cases where a non-literal token is encountered, a token could have been included in the parsed code directly from attacker-controlled information, and thus, is an instance of a code injection attack.

As soon as one of the parsers 225 and 226 encounter a tainted code token, the parsing process can be stopped and a security exception can be asserted. The attacker injected code can be reliably prevented from being executed because the attacker-injected syntax never leaves the parsing process. As long as both components (both the server and the browser) are used together and the mitigation option is enabled, the system described in this disclosure is not susceptible to string-based injection attacks. This means, vulnerabilities such as XSS, SQL injection or Command Injection are not exploited.

Character Taint Transfer Protocol ("CTTP")

The techniques described in this disclosure include transmitting additional information about variable, and potentially attacker-modifiable, data chunks in web application responses, which is referred to as "taint information". CTTP enables the server to report this information to the client and to report the source and other useful information when tainted content is encountered that suggests a vulnerability (detection). This may allow the verification of a potential vulnerability and facilitate debugging of the origin (source) of the data chunk depending on the taint information provided. The client web browser can then choose not to execute specific content included in the tainted chunks (mitigation). This additional information can be provided using a protocol that defines multiple response formats which differ in their verbosity of the server-side taint information.

It should be noted that, although the embodiments described in this disclosure are focused on CTTP communications, the techniques described herein are applicable to any modified HTTP communication (request or response) to include a multipart network transfer protocol configured for facilitating end-to-end taint tracking for web-based applications.

Figure 3:
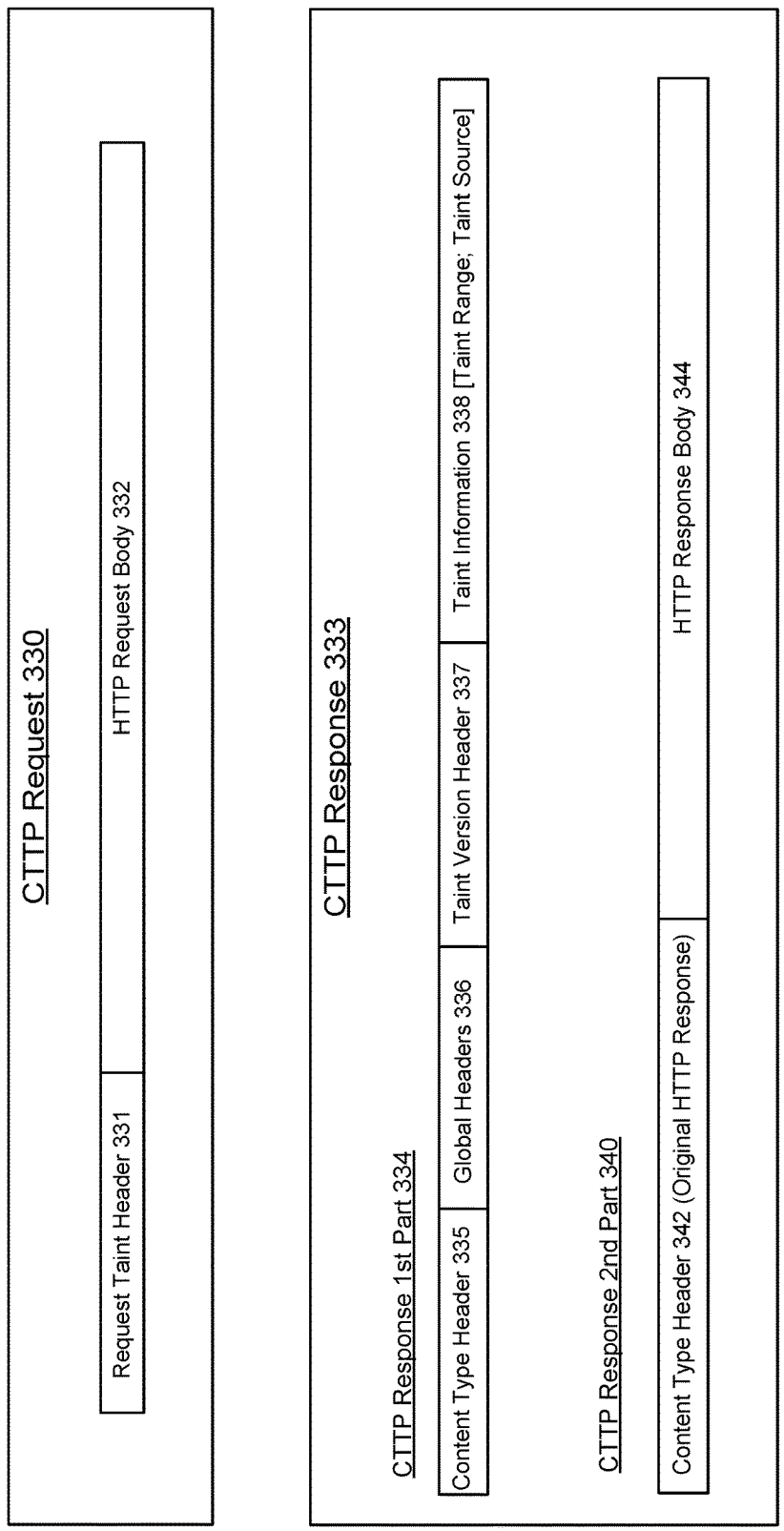
FIG. 3 depicts block diagrams of example embodiments of a Character Taint Transfer Protocol ("CTTP") request and response in accordance with the techniques described in this disclosure.

FIG. 3 depicts block diagrams of example embodiments of a CTTP request and CTTP response in accordance with the techniques described in this disclosure. In the illustrated embodiment, CTTP request 330 includes a request taint header 331 and a the body of an HTTP response 332. CTTP response 333 includes a first part 334 and a second part 340. In this embodiment, the CTTP response first part 334 comprises a content type header 335, a global headers section 336, a taint version header 337 and taint information 338 in the body of the CTTP response. The taint information in this embodiment includes a taint range and an identifier of the source of the potentially tainted content.

In at least certain embodiments, the overall HTTP request mechanism can be modified by defining a new header in the CTTP request 330. The new header may be referred to as "request taint" header 331. Its purpose is to signal support of CTTP to the server and thus request taint information if needed and supported by the server side. Upon reception at the server, it may enable its features allowing it to generate taint information and to transmit the information in the corresponding server response.

Any request taint field's value above 0 may express the maximal supported CTTP version by the user agent. A value of 0 in the request taint header may be handled by the server as if the user agent does not support CTTP at all. This allows the user agent to disable transmission—and possibly even generation—of taint information to save computation time and bandwidth, in case it is not needed. Upon reception of a valid request taint header 331 value with a supported CTTP version, the server may enable its features allowing generation of taint information to then transmit this information in the corresponding CTTP response as outlined below.

The HTTP response mechanism can be modified to allow the server to transmit taint information to the client independent of the data format and type of the response body. The purpose of the modifications to the standard HTTP response is to allow the server to transmit taint information to the client independent of the data format or data type of the regular response's body while still adhering to all relevant standards. A CTTP response 333 can include an HTTP response with a multipart/mixed type, which includes both the taint information and the regular body of the response. In one embodiment, the multipart/mixed type includes a Multipurpose Internet Mail Extensions ("MIME") type. The taint information can be communicated in a custom format while still being isolated and still conforming to the original standards for HTTP responses. In at least certain other embodiments, an alternative approach can be to include the taint information of the response in a single header.

After generating the a HTTP response, the server builds a CTTP multipart response 333. The first part of the CTTP multipart response 334 contains the taint information. This allows the client system to conveniently analyze the taint information first, and then directly apply it when processing the regular HTTP response body 334. The second part of the CTTP response 340 comprises the HTTP response. The body of the HTTP response 344 can be added to the second part 340 of the CTTP multipart response 333. In one embodiment, a content type header 342 can also be added to the second part 340 of the CTTP multipart response 333.

The taint version header 337 can then be appended to the header section of the CTTP response 333 indicating the actual version of the taint information 338 carried in the first part of the CTTP response 334. The server may then adjust the header added to the header section of the CTTP response to form a standard HTTP response. This may be required, for example, if a content length header or a transfer encoding header is present in the HTTP request.

This completed CTTP response 333 can then be communicated to the client system. When receiving a response to a CTTP marked request, the client system can determine if the response contains CTTP data and can handle such requests accordingly, i.e. parse the taint information and apply it when processing the HTTP body.

The taint information format may contain an expression of the range of characters or bytes that are known to be tainted. These may be addressed by non-negative 0-subscripted indices, whereby each range has a start and an end with the start being inclusive, end exclusive: [s; e]. For example, a range of 5; 10 can indicate that the characters/bytes at the indices 5-9 are tainted. These ranges refer to the payload characters after they are decoded with respect to their character set ("charset"). If the payload is not subject to a charset, i.e. is raw binary data, the ranges refer to the bytes.

CTTP therefore adds a new header "request taint" 331 to the HTTP requests and a new header "taint version" 337 to the HTTP responses.

Compatibility

In one embodiment, if the value of the request taint header 331 is 0 or includes an unsupported CTTP version, or if there is no request taint header 337 in a request from the client, the server may treat the request as a standard HTTP request. As CTTP builds on top of HTTP changing only semantics by using HTTP's features, compatibility with HTTP-supported systems can be automatically achieved. User agents without CTTP support do not request taint information and thus do not receive CTTP responses which could be misinterpreted. Servers receiving requests with the request taint header on the other hand can silently ignore it according to the HTTP standard. Unaware intermediate nodes either just pass the CTTP request/response as is, due to its compatibility with HTTP or decide to remove unknown headers or fields, which is tolerated by CTTP compatible servers and user agents.

I. Exemplary Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

Figure 4:
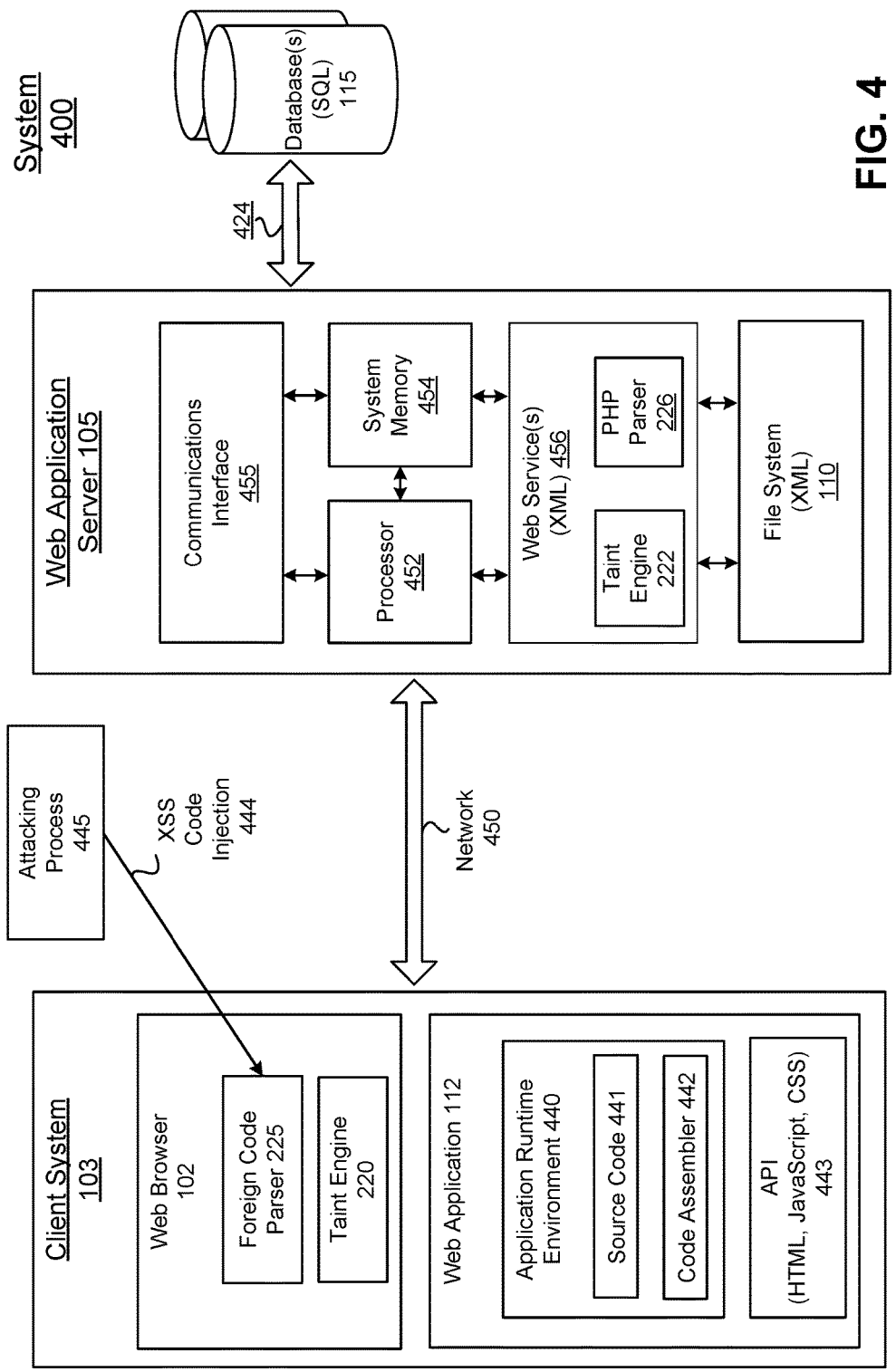
FIG. 4 depicts a conceptual block diagram of an example embodiment of an end-to-end taint tracking system in accordance with the techniques described in this disclosure.

FIG. 4 depicts a conceptual block diagram of an example embodiment of an end-to-end taint tracking system configured in accordance with the techniques described in this disclosure. In the illustrated embodiment, the client system 103 is in communication with a web application server 105 via one or more networks 450. In this example, the client system comprises a web browser 102 and a web application 112. The web browser includes a foreign code parser 225 and a taint engine 220 (see FIG. 2). In one embodiment, the foreign code parser 225 is taint aware. In this example, the web application 112 comprises an application runtime environment 440 and one or more APIs 443. The runtime environment 440 includes source code 441 and a code assembler 442. In various embodiments, APIs 443 may comprise HTML, JavaScript, or CSS APIs.

The web application server 105 may be implemented as an individual computer hardware server or as an array of computer hardware servers logically coupled together and working in a functionally coordinated manner. The web application server 105 in this example includes a processor 452, a memory system 454, a network communications interface 455, one or more web services 456, and a file system 110, which may comprise an XML file system. Web services 456 comprises a taint engine 222 and a PHP parser 226 (see FIG. 2). In one embodiment, the web services 456 may be implemented as XML web services and the PHP parser 226 may be taint aware. The web application server 105 can perform data accesses operations on data stored in the database(s) 115 via one or more communications networks or links 424.

In this embodiment, the web application server 105 is in communication with the client 103 over one or more communication networks 450. The processor 452 of the web application server 105 is configured to receive client communications over the network 450 at the communications interface 455. The processor 452 is also configured to communicate with the client system 103 over the network(s) 450 from the communications interface 455.

As will be appreciated by persons of skill in the art, network(s) 450 may be implemented as a single wired or wireless network, or multiple separate networks in communication with one another. Network(s) 450 may be implemented as any wired or wireless network(s). For example, the networks 450 described herein can be implemented as a local area network ("LAN"), wide-area network ("WAN"), combination of LANs and WANs, the Internet, or any other type of communication network adapted for communicating electronic messages and information. Further, network(s) 450 may be implemented as a physical array of hardware resources or as a virtual array, or any combination thereof. Network(s) 450 may also be implemented in a cloud-based network configuration. For example, network(s) 450 may be implemented as public or private cloud network, or combination thereof. No specific network or network architecture should be construed as limiting the embodiments and techniques described herein.

In FIG. 4, the web application server 105 is further in communication with one or more databases 115 via one or more communication networks or mediums 424. In one embodiment, the database(s) 115 may comprise SQL database(s). The databases 114 are adapted to store data. In one embodiment, the web application server 105 may be in remote communication with the databases 115 via networks 424. Alternatively, database 115 may be a component of the web application server 105 and configured to communicate with the web application server 105 via a direct or indirect connection or network 424. In addition, the database(s) 115 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

The web application server 105 also includes one or more memory systems 454 in communication with the one or more processors 452 via one or more communication mediums, such as an interconnect bus. The processor 452 may be configured to communicate with the memory subsystem 454 to store and retrieve data for performing operations of the web application server 105. The memory system 454 may include multiple memory components of different types, including random access memory ("RAM"), read only memory ("ROM"), flash memory, cache memory, memory buffers, and/or disk-based memory, or combination thereof, etc. The memory system 454 may be configured to store information and instructions to be executed by the one or more processors 452, including information and instructions for performing the techniques described in this disclosure. The memory system 454 may also be used for storing programs executed by the processor 452. The memory system 454 may further include a disk-based storage device, such as a hard disk storage devices, for storing information and instructions. Typically such a storage device comprises nonvolatile memory. Common forms of such storage devices include, for example, a hard drive, a magnetic disk, an optical disk, a CD-ROM, a DVD, a flash memory or other non-volatile memory, a universal serial bus ("USB") memory card, or any other computer-readable medium from which a computer can read computer data and instructions.

As shown in the illustrated embodiments, an attacking process 445 may assert an attack 444 on the web browser 102 of the client system 103 via the foreign code parser 220 as described above. In one embodiment, the attack 444 may comprise an XSS code injection into the web application runtime environment 440 via the parser 225. The processes for detecting and mitigating such attacks 444 using end-to-end taint tracking is discussed in the following sections of this disclosure.

II. Exemplary Processes

The following figures depict example flow charts illustrating various embodiments of a process for end-to-end taint tracking in accordance with the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 5:
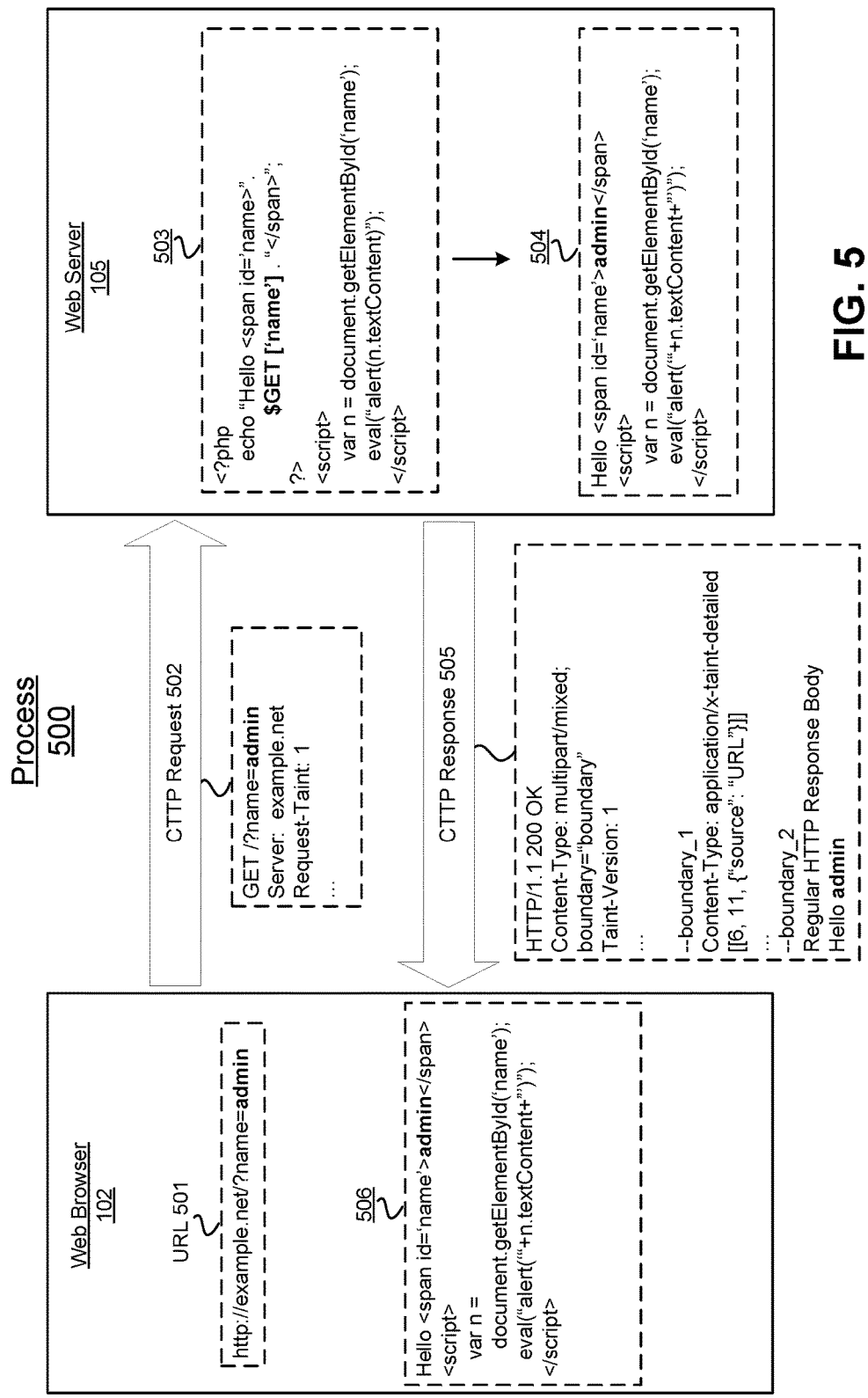
FIG. 5 depicts a conceptual block diagram of an example embodiment of a process of taint tracking between a client and server in accordance with the techniques described in this disclosure.

FIG. 5 depicts a conceptual block diagram of an example embodiment of a process of taint tracking between a client and server in accordance with the techniques described in this disclosure. In the illustrated embodiment, process 500 begins by receiving a request for a URL 501 at the client's web browser 102. A CTTP request 502 is then generated and provided to a web application server 105 to fulfill the request. In this example, the CTTP request 502 includes a standard HTTP request and a request taint header value as discussed previously. In this case, the request taint value in the request taint header is set to 1.

At operation 503, the web server 105 generates a PHP script to retrieve content to fulfill the request and executes the PHP script at operation 504 as shown. The web server 105 can then generate the CTTP response 505 based on the request. The CTTP response includes a taint version header as discussed above. In this case, the taint version header value is also set equal to 1. The request taint header value of the CTTP request and the taint version header value of the CTTP response indicate that both the client and server support CTTP communications.

The CTTP response 505 further includes the taint information comprising the content type, taint range for the HTTP response body, and identifies the source of the tainted content. The web browser 102 then receives at operation 506, the CTTP response including the taint information provided by the web server 105. This completes example process 500.

Figure 6A:
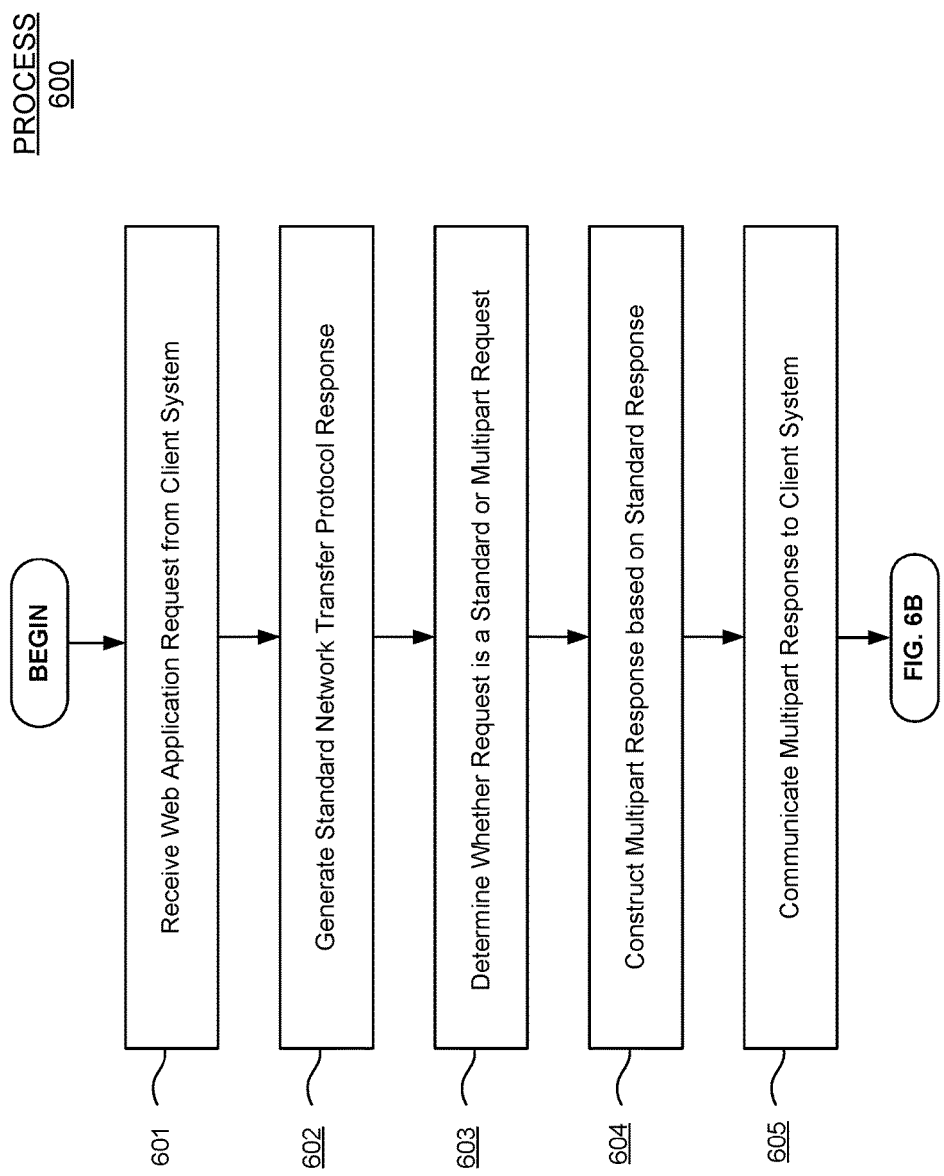

FIGS. 6A-6B depict flow charts of an example embodiment of a process for performing end-to-end taint tracking in accordance with the techniques described in this disclosure. In the illustrated embodiment of FIG. 6A, process 600 begins at operation 601 by receiving a request from a web application of a client system via a communications link. In one embodiment, the request may be received by a taint engine of a server computer comprising one or more processors and a memory system adapted to store computer programs for execution by the processors. The request may include a request header and a request body. Process 600 can then be configured to generate a standard network transfer protocol response comprising a response header and a response body in response to the request from the client system (operation 602).

Process 600 continues at operation 603 by evaluating a "request taint" value in the request header to determine whether the request is a standard network transfer protocol request (e.g., HTTP request) or a multipart network transfer protocol request (e.g., CTTP request). In one embodiment, this determination may be based on whether the request taint value is compatible with a multipart network transfer protocol such as CTTP.

If the request is determined to be a multipart network transfer protocol request (e.g., CTTP request), process 600 continues by constructing a multipart network transfer protocol response (e.g., CTTP response) based on the generated standard network transfer protocol response (operation 604).

Process 600 continues at operation 605 by communicating the multipart network transfer protocol response to the client system. The client system can be configured to detect potentially tainted content based on evaluating the multipart network transfer protocol response.

In one embodiment, the multipart network transfer protocol response includes a first subpart comprising a taint version header and taint information and a second subpart comprising a content type header and the standard network transfer protocol response body.

Process 600 continues at operation 606 of FIG. 6B, where the client system receives the multipart network transfer protocol response. In one embodiment, the response is received at a taint engine of the client system that is complementary to the taint engine of the server. The client system can then parse the taint information of the first subpart of the multipart network transfer protocol response in accordance with a content type stored in the content type header of the second subpart of the multipart network transfer protocol response (operation 607) and apply the taint information to the standard network transfer protocol response body (operation 608).

If the taint information indicates tainted content has been detected in the response body, process 600 can be configured to determine not to execute the tainted content or to report the source of the tainted content to a user of the client system, or both (operation 609). The client system can also mark the tainted segments of the standard network transfer protocol response body as tainted (operation 610), generate a document object model (operation 611) and propagate the marked tainted segments into the document object model (operation 612).

In one embodiment, content can be determined to be potentially tainted that originates from server-side sources including HTTP parameters, HTTP headers, HTTP method and request line, and HTTP body and metadata objects, or from client-side sources such as XMLHttpRequest responses, PostMessages, referrers, document.URL and document.location. Also the taint information may include a taint range and an identifier of a source from which the tainted content originated as discussed previously.

In one embodiment, constructing the multipart network transfer protocol response further comprises adding a content length header or transfer encoding header to a global header section of the multipart network transfer protocol response and adjusting the content length header or the transfer encoding header to conform with the standard network transfer protocol response.

In one embodiment, the standard network transfer protocol response can then be communicated to the client system if the request is determined to be a standard network transfer protocol request or the request header does not contain the request taint value compatible with a multipart network transfer protocol. The content type header may comprise an extended content type or a compressed content type. The request taint header may be used to indicate a maximum version of the multipart network transfer protocol response supported by the client system.

Figure 7A:
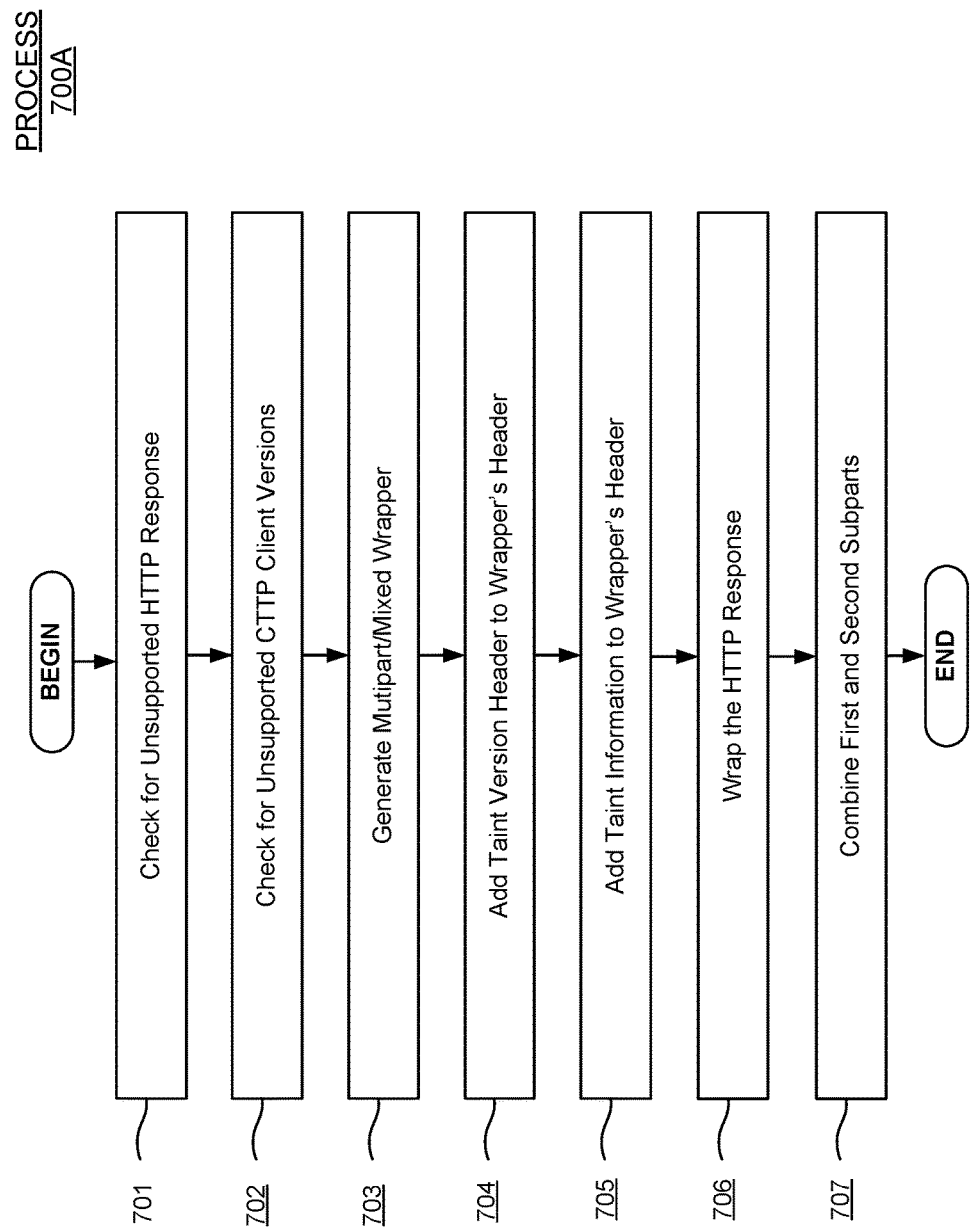
FIG. 7A depicts a flow chart of an example embodiment of a CTTP response generator process according to the techniques described in this disclosure.

FIG. 7A depicts a flow chart of an example embodiment of a CTTP response generator process according to the techniques described in this disclosure. In the illustrated embodiment, process 700A first checks for an unsupported HTTP response (operation 701). If the HTTP response content's top-level media type itself is multipart, this response cannot be wrapped in a CTTP response. Thus, the HTTP response is transmitted verbatim. Process 700A continues by checking for unsupported CTTP client versions (operation 702). If the server can only output taint information above the client's maximum supported version, as indicated in the request taint header, the HTTP response is also transmitted verbatim.

Process 700A continues by generating a multipart/mixed wrapper at operation 703. A new, empty HTTP response and message is generated with a multipart/mixed media type and two subparts. The taint version header can then be added to the generated response wrapper's header section to indicate a taint response is requested (operation 704) and the taint information can be included (operation 705). In one embodiment, this can be accomplished by attaching the content type header to the first subpart's header section and adding the taint information into the body of the first part.

Process 700A continues by wrapping the HTTP response (operation 706). In one embodiment, the headers (except for the content type header of the original HTTP response) can be added to the global section header of the new HTTP response and the content type header can be added to the second subpart. The body of the original HTTP response can also be added to the body of the second subpart. The content length or transfer encoding headers can be adjusted in the global headers section if needed.

Finally, the first subpart and the second subpart can be combined at operation 707. IN this operation, the content type header of the multipart message can be attached to the new HTTP response header section and the multipart's combined payload can be attached to the new HTTP response body. This completes process 700A according to one example embodiment.

Figure 7B:
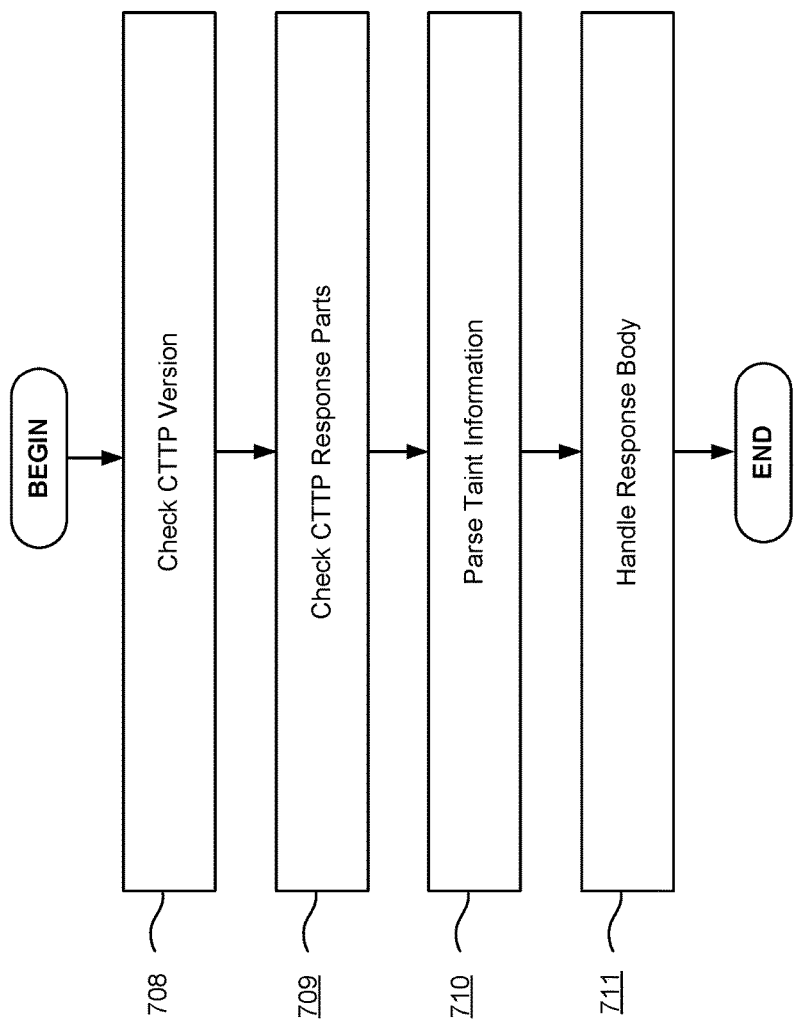
FIG. 7B depicts a flow chart of an example embodiment of a CTTP response parsing process according to the techniques described in this disclosure.

FIG. 7B depicts a flow chart of an example embodiment of a CTTP response parsing process according to the techniques described in this disclosure. In the illustrated embodiment, process 700B begins by checking for the CTTP version (operation 708). If the response does not contain a taint version header or it has an invalid value, the response is handled like a standard HTTP response. Process 700B can then check the parts of the CTTP response (operation 709). If the response contains no content type header, its value is not multipart/mixed, or it does not have two parts, as determined by the boundary, the response is handled like a regular HTTP response.

Process 700B continues at operation 710 by parsing the taint information. The first part of the response is read, and if it does not include a content type header or it contains an invalid value, the response is handled like a standard HTTP response. Otherwise, the contents can be parsed according to the content type. If an error occurs while parsing the taint information, the response is also handled like a standard HTTP response.

Finally, the regular body of the response can be handled (operation 711). The second part of the response is read, and if it does not have a content type header or it contains an invalid value, the response is handled like a standard HTTP response. The body of this part is handled as a regular HTTP body using the content type of the part and the headers provided in the global headers section. The parsed taint information from the previous part may be used here. This completes process 700B according to one example embodiment.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
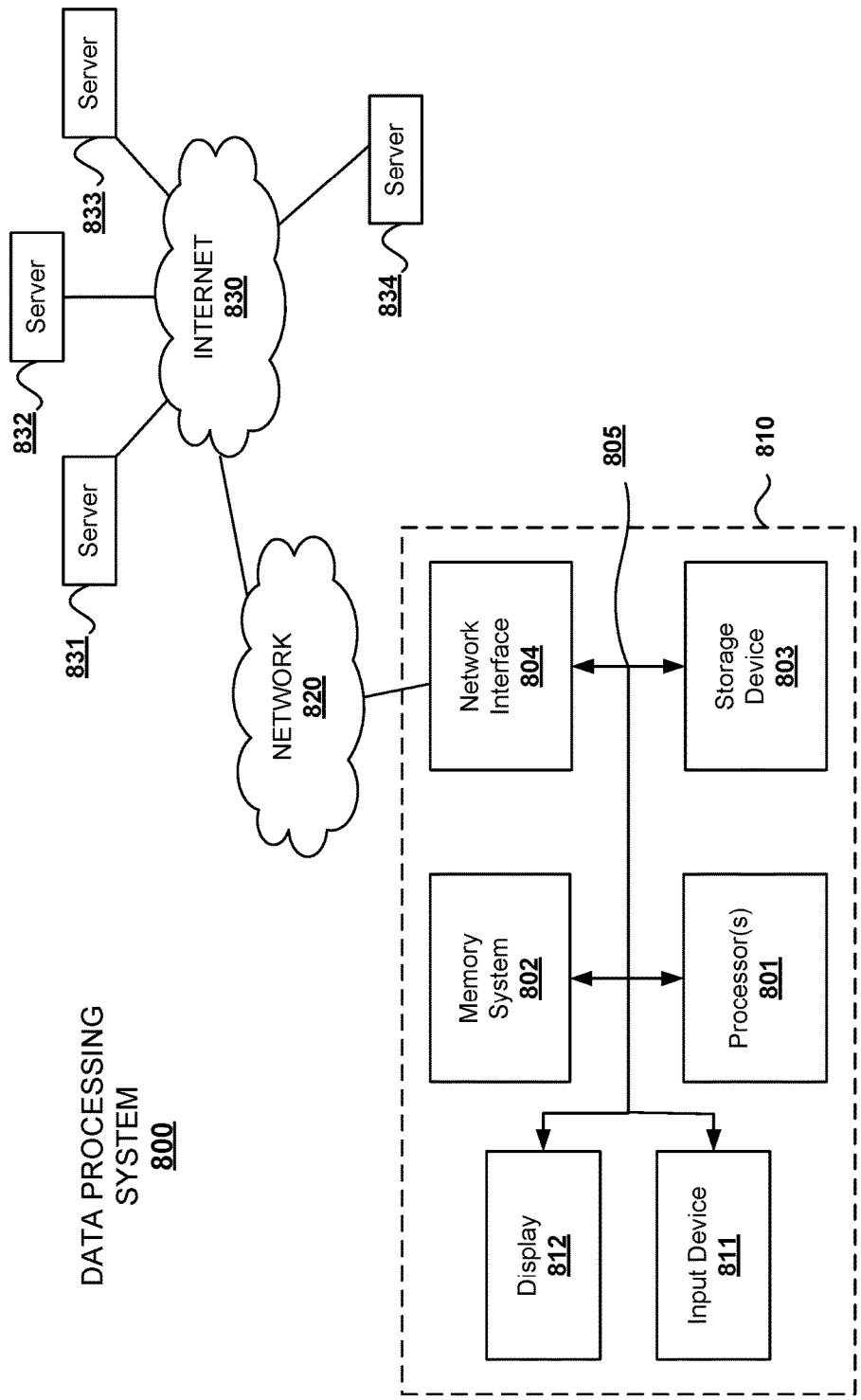
FIG. 8 depicts an example overview block diagram of a data processing system upon which the embodiments described in this disclosure may be implemented.

FIG. 8 depicts an example overview block diagram of a data processing system upon which the embodiments described in this disclosure may be implemented. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure.

It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

APPENDIX A

Example Pseudo Code for Various Taint Tracking Operations

Example Pseudo Code for Foreign Code Assembly

```
// foreign HTML code
String url = getURLData( );
String hyperlink = "<a href=''" + url + "'>go</a>";
writer.println(hyperlink);
// foreign SQL code
String userID = getUID( );
String sql = "SELECT * FROM users";
sql = sql + " WHERE UID = " + userID;
con.execute(sql);
```

Example Pseudo Code for a SQL Injection Vulnerability

```
<?php
// SQL Injection in GET pranmeter UID
$userID = $_GET["UID"];
$sql = "SELECT * FROM users";
$sql = $sql + " WHERE UID = " + $userID;
con.execute(sql);
?>
```

Example Pseudo Code for Command Shell Injection

```
// the content of $email is controlled by the attacker
$handle = popen ("/usr/bin/mail $email");
fputs ($handle, ...); # write the message
```

Example Pseudo Code for Path Traversal Vulnerability

```
<?php
// Exploitable by accessing
// http://vic.org/vul.php?template=../../../../etc/passwd
$template = 'blue.php';
if ( is_set( $_GET['template'] ) )
$template = $_GET['template'];
include ( "/home/users/victim/templates/" . $template );
?>
```

What is claimed is:

1. A method comprising:
   in a server comprising one or more processors and a memory system adapted to store one or more computer programs for execution by the one or more processors:
   receiving, at a taint engine of the server, a request from a web application of a client system via a communications link, the request comprising a request header and a request body;
   performing a parsing process by a parser of the taint engine of the server, the parsing process including:
   parsing the request into the request header and the request body and including code associated with the parsed request header and the parsed request body;
   identifying at least one non-literal token in a syntax of the code, the at least one non-literal token indicative of an attacker-injected code associated with a portion of the code, and upon identifying the at least one non-literal token, executing a portion of the code not associated with the at least one non-literal token while avoiding execution of the portion of the code associated with the at least one non-literal token;

generating a standard network transfer protocol response comprising a response header and a response body in response to the request from the client system, the generated standard network transfer protocol response void of the portion of the code associated with the at least one non-literal token;

evaluating a request taint value in the request header to determine whether the request is a standard network transfer protocol request or a multipart network transfer protocol request;

if the request is a multipart network transfer protocol request, constructing a multipart network transfer protocol response based on the generated standard network transfer protocol response, the multipart network transfer protocol response further comprising:
 a first subpart comprising a taint version header and taint information, and
 a second subpart comprising a content type header and the response body of the standard network transfer protocol; and communicating the multipart network transfer protocol response to the client system, wherein the client system is configured to detect tainted content based on the multipart network transfer protocol response.

2. The method of claim 1 further comprising communicating the standard network transfer protocol response to the client system if the request is a standard network transfer protocol request.

3. The method of claim 1 wherein the client system is configured for:
 receiving, at a taint engine of the client system complementary to the taint engine of the server, the multipart network transfer protocol response;
 parsing the taint information in the first subpart of the multipart network transfer protocol response in accordance with a content type stored in the content type header in the second subpart of the multipart network transfer protocol response; and
 if the taint information indicates tainted content has been detected, determining not to execute the tainted content or reporting a source of the tainted content to a user of the client system.

4. The method of claim 3 wherein the client system is further configured for:
 marking tainted segments of the response body of the standard network transfer protocol;
 generating a document object model; and
 propagating the marked segments into the document object model.

5. The method of claim 1 wherein the content type header comprises an extended content type or a compressed content type.

6. The method of claim 1 wherein content is determined to be potentially tainted that originates from server-side sources including HTTP parameters, HTTP headers, HTTP method and request line, or HTTP body and metadata objects.

7. The method of claim 1 wherein content is determined to be potentially tainted that originates from client-side sources including XMLHttpRequest responses, PostMessages, referrers, document.URL or document.location.

8. The method of claim 1 wherein the taint information includes a taint range and an identifier of a source from which the tainted content originated.

9. The method of claim 1 wherein constructing the multipart network transfer protocol response further comprises:
 adding a content length header or transfer encoding header to a global header section of the multipart network transfer protocol response; and
 adjusting the content length header or the transfer encoding header to conform with the standard network transfer protocol response.

10. The method of claim 1 wherein the request taint header indicates a maximum version of the multipart network transfer protocol response supported by the client system.

11. The method of claim 1 wherein the attacker-injected code is a tainted HTML tag name, Cross-Site Scripting (XSS), or a Structured Query Language (SQL) keyword.

12. A system comprising:
 one or more processors;
 a system memory in communication with the one or more processors via one or more communication mediums, the system memory configured to store programmed computer code, which when executed by the one or more processors, causes the one or more processors to perform operations comprising:
 receiving, at a taint engine, a request from a web application of a client system via a communications link, the request comprising a request header and a request body;
 performing a parsing process by a parser of the taint engine of the server, the parsing process including:
  parsing the request into the request header and the request body and including code associated with the parsed request header and the parsed request body;
  identifying at least one non-literal token in a syntax of the code, the at least one non-literal token indicative of an attacker-injected code associated with a portion of the code, and
  upon identifying the at least one non-literal token, executing a portion of the code not associated with the at least one non-literal token while avoiding execution of the portion of the code associated with the at least one non-literal token;
 generating a standard network transfer protocol response comprising a response header and a response body in response to the request from the client system, the generated standard network transfer protocol response void of the portion of the code associated with the at least one non-literal token;
 evaluating a request taint value in the request header to determine whether the request is a standard network transfer protocol request or a multipart network transfer protocol request;
 if the request is a multipart network transfer protocol request, constructing a multipart network transfer protocol response based on the generated standard network transfer protocol response, the multipart network transfer protocol response further comprising:
  a first subpart comprising a taint version header and taint information, and
  a second subpart comprising a content type header and the response body of the standard network transfer protocol; and
 communicating the multipart network transfer protocol response to the client system, wherein the client system is configured to detect tainted content based on the multipart network transfer protocol response.

13. The system of claim 12 wherein the operations further comprise communicating the standard network transfer protocol response to the client system if the request is a standard network transfer protocol request.

14. The system of claim 12 wherein the client system is configured for:
receiving, at a taint engine of the client system, the multipart network transfer protocol response;
parsing the taint information of the first subpart of the multipart network transfer protocol response in accordance with a content type stored in the content type header of the second subpart of the multipart network transfer protocol response; and
if the taint information indicates tainted content has been detected, determining not to execute the tainted content or reporting a source of the tainted content to a user of the client system.

15. The system of claim 12 wherein the taint information includes a taint range and an identifier of a source from which the tainted content originated.

16. The system of claim 12 wherein the attacker-injected code is a tainted HTML tag name, Cross-Site Scripting (XSS), or a Structured Query Language (SQL) keyword.

17. A non-transitory computer readable storage medium embodying programmed computer code, which when executed by a computer system, causes the computer system to perform operations comprising:
receiving, at a taint engine of the computer system, a request from a web application of a client system via a communications link, the request comprising a request header and a request body;
performing a parsing process by a parser of the taint engine of the server, the parsing process including:
parsing the request into the request header and the request body and including code associated with the parsed request header and the parsed request body;
identifying at least one non-literal token in a syntax of the code, the at least one non-literal token indicative of an attacker-injected code associated with a portion of the code, and
upon identifying the at least one non-literal token, executing a portion of the code not associated with the at least one non-literal token while avoiding execution of the portion of the code associated with the at least one non-literal token;
generating a standard network transfer protocol response comprising a response header and a response body in response to the request from the client system, the generated standard network transfer protocol response void of the portion of the code associated with the at least one non-literal token;
evaluating a request taint value in the request header to determine whether the request is a standard network transfer protocol request or a multipart network transfer protocol request;
if the request is a multipart network transfer protocol request, constructing a multipart network transfer protocol response based on the generated standard network transfer protocol response, the multipart network transfer protocol response further comprising:
a first subpart comprising a taint version header and taint information, and
a second subpart comprising a content type header and the response body of the standard network transfer protocol; and
communicating the multipart network transfer protocol response to the client system,
wherein the client system is configured to detect tainted content based on the multipart network transfer protocol response.

18. The non-transitory computer readable storage medium of claim 17 wherein the operations further comprise communicating the standard network transfer protocol response to the client system if the request is a standard network transfer protocol request.

19. The non-transitory computer readable storage medium of claim 17 wherein the client system is configured for:
receiving, at a taint engine of the client system complementary to the taint engine of the computer system, the multipart network transfer protocol response;
parsing the taint information in the first subpart of the multipart network transfer protocol response in accordance with a content type stored in the content type header in the second subpart of the multipart network transfer protocol response; and
if the taint information indicates tainted content has been detected, determining not to execute the tainted content or reporting a source of the tainted content to a user of the client system.

20. The non-transitory computer readable storage medium of claim 17 wherein the attacker-injected code is a tainted HTML tag name, Cross-Site Scripting (XSS), or a Structured Query Language (SQL) keyword.

* * * * *